(12) United States Patent
Holsteen et al.

(10) Patent No.: US 11,804,197 B1
(45) Date of Patent: Oct. 31, 2023

(54) OPTICAL SYSTEMS HAVING OVERDRIVEN FLCOS DISPLAY PANELS

(71) Applicant: Apple Inc., Cupertino, CA (US)

(72) Inventors: Aaron L. Holsteen, Aurora, CO (US); Xiaokai Li, Mountain View, CA (US); Yuan Chen, Campbell, CA (US); Zhibing Ge, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/459,731

(22) Filed: Aug. 27, 2021

Related U.S. Application Data

(60) Provisional application No. 63/072,009, filed on Aug. 28, 2020.

(51) Int. Cl.
  *G09G 3/36* (2006.01)
  *G02F 1/135* (2006.01)

(52) U.S. Cl.
  CPC ......... *G09G 3/3696* (2013.01); *G02F 1/1352* (2021.01); *G02F 1/1358* (2013.01); *G09G 2230/00* (2013.01); *G09G 2320/041* (2013.01)

(58) Field of Classification Search
  CPC .. G09G 2230/00; G09G 2310/06; G09G 3/36; G09G 2310/061; G09G 2310/066; G09G 3/3651; G09G 3/3603
  See application file for complete search history.

(56) References Cited

U.S. PATENT DOCUMENTS

| | | | |
|---|---|---|---|
| 8,643,633 B2 | 2/2014 | Sakashita | |
| 8,941,580 B2 | 1/2015 | Li et al. | |
| 2008/0180385 A1* | 7/2008 | Yoshida | G09G 3/2074 345/87 |
| 2009/0278869 A1 | 11/2009 | Oishi et al. | |
| 2010/0214271 A1* | 8/2010 | Mizusako | G09G 3/3648 345/204 |
| 2010/0225641 A1* | 9/2010 | Suguro | G09G 3/3629 345/87 |
| 2010/0289974 A1* | 11/2010 | Kim | H04N 13/341 348/51 |
| 2011/0096254 A1* | 4/2011 | Ikeda | G02F 1/13306 349/33 |
| 2012/0147280 A1* | 6/2012 | Osterman | G02B 30/25 349/8 |
| 2013/0162917 A1* | 6/2013 | Sagawa | H04N 9/3155 349/5 |
| 2016/0133201 A1* | 5/2016 | Border | G06F 1/163 345/694 |

\* cited by examiner

*Primary Examiner* — Kevin M Nguyen
(74) *Attorney, Agent, or Firm* — Treyz Law Group, P.C.; Michael H. Lyons

(57) ABSTRACT

A display may include illumination optics, a ferroelectric liquid crystal on silicon (fLCOS) panel, and a waveguide. The display may include a temperature sensor that gathers temperature sensor data. Control circuitry may select a non-square wave drive voltage waveform based on the gathered temperature sensor data and/or based on frame history information for the fLCOS display panel. The control circuitry may control the fLCOS panel to produce image light by driving the fLCOS panel using the selected non-square wave drive voltage waveform. The non-square wave drive voltage waveform may be an overdrive waveform or an underdrive waveform. This may serve to optimize the reflectance of the fLCOS display panel and thus the optical performance of the display module regardless of operating temperature and frame history.

18 Claims, 8 Drawing Sheets

OPTICAL SYSTEMS HAVING OVERDRIVEN FLCOS DISPLAY PANELS

This application claims the benefit of U.S. Provisional Patent Application No. 63/072,009, filed Aug. 28, 2020, which is hereby incorporated by reference herein in its entirety.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The display may include a display module and a waveguide. The display module may include a spatial light modulator such as a ferroelectric liquid crystal on silicon (fLCOS) display panel and illumination optics. The illumination optics may include light sources such as light emitting diodes (LEDs) that produce illumination light. The illumination light may be provided with a linear polarization and may be transmitted to the fLCOS display panel. The fLCOS display panel may modulate image data (e.g., image frames) onto the illumination light to produce image light. The waveguide may direct the image light towards an eye box.

The display may include a temperature sensor that gathers temperature sensor data. Control circuitry may select a non-square wave drive voltage waveform based on the gathered temperature sensor data and/or based on frame history information for the fLCOS display panel. The control circuitry may control the fLCOS panel to produce the image light by driving the fLCOS panel using the selected non-square wave drive voltage waveform. The non-square wave drive voltage waveform may be an overdrive waveform or an underdrive waveform. This may serve to optimize the reflectance of the fLCOS display panel and thus the optical performance of the display module regardless of operating temperature and frame history.

DETAILED DESCRIPTION

Figure 1:
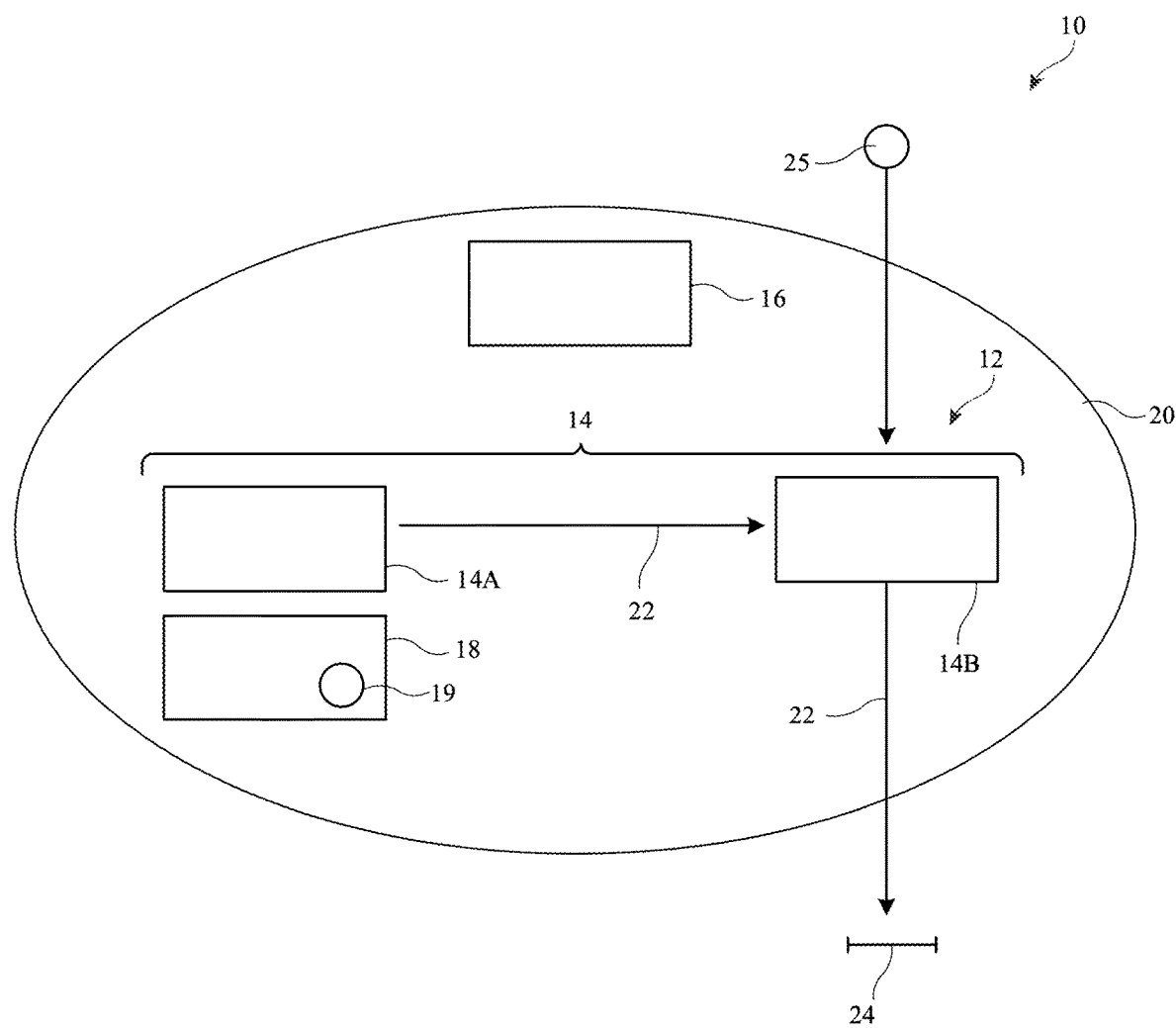
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, the sensors in components 18 may include one or more temperature (T) sensors 19. Temperature sensor(s) 19 may gather temperature sensor data (e.g., temperature values) from one or more locations in system 10. If desired, control circuitry 16 may use the gathered temperature sensor data in controlling the operation of display module 14A.

Display modules 14A (sometimes referred to herein as display engines 14A, light engines 14A, or projectors 14A) may include reflective displays (e.g., displays with a light source that produces illumination light that reflects off of a reflective display panel to produce image light such as liquid crystal on silicon (LCOS) displays (e.g., ferroelectric liquid crystal on silicon (fLCOS) displays), digital-micromirror device (DMD) displays, or other spatial light modulators), emissive displays (e.g., micro-light-emitting diode (uLED) displays, organic light-emitting diode (OLED) displays, laser-based displays, etc.), or displays of other types. An arrangement in which display module 14A includes an fLCOS display is sometimes described herein as an example. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
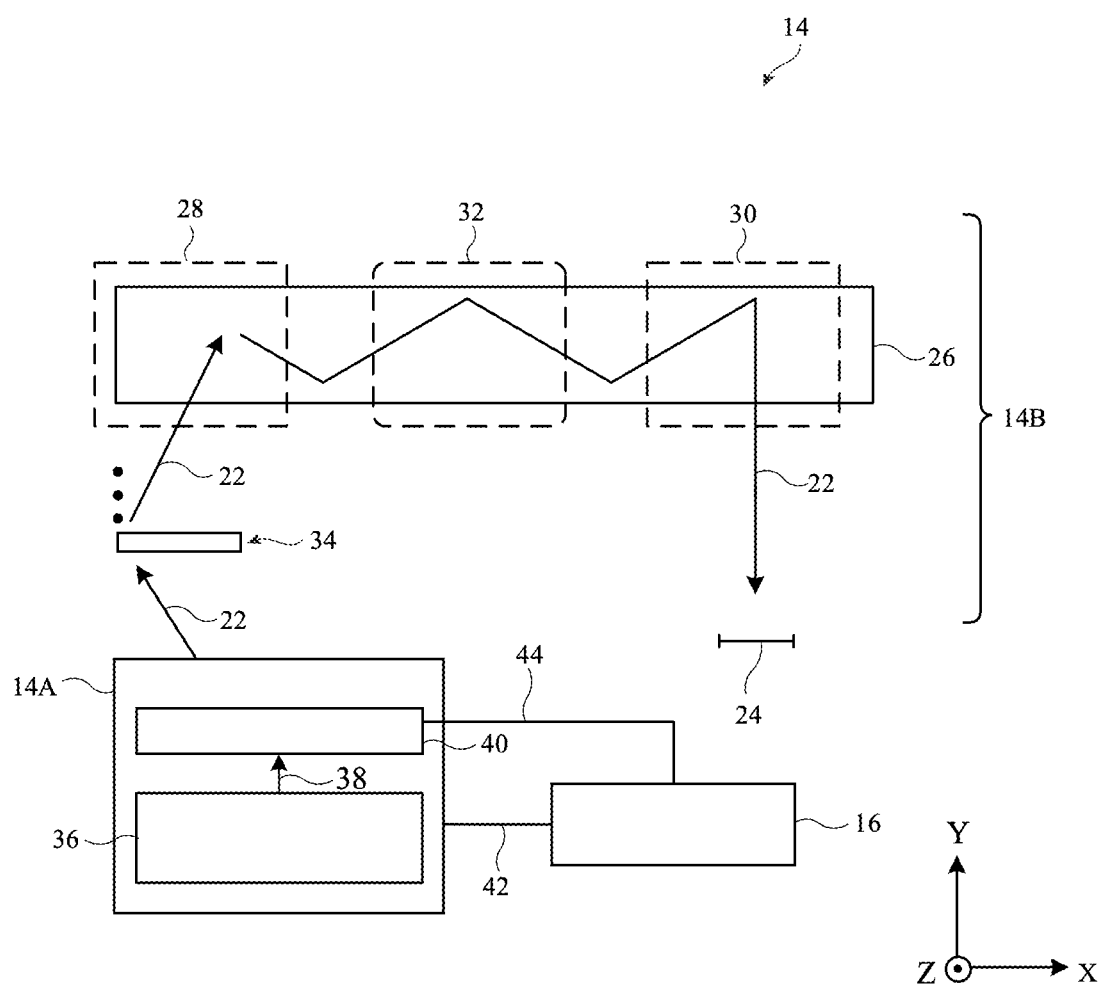
FIG. 2 is a top view of an illustrative optical system for a display having a display module that provides image light to a waveguide in accordance with some embodiments.

FIG. 2 is a top view of an illustrative display 14 that may be used in system 10 of FIG. 1. As shown in FIG. 2, display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. Collimating lens 34 is shown external to display module 14A in FIG. 2 for the sake of clarity. In general, collimating lens 34 may be formed entirely external to display module 14A, entirely within display module 14A, or one or more lens elements in collimating lens 34 may be formed in display module 14A (e.g., collimating lens 34 may include both lens elements that are internal to display module 14A and lens elements that are external to display module 14A). Collimating lens 34 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, control circuitry 16 may control display module 14A to generate image light 22 associated with image content (data) to be displayed to (at) eye box 24. In the example of FIG. 2, display module 14A includes illumination optics 36 and a spatial light modulator such as fLCOS display panel 40 (sometimes referred to herein simply as fLCOS panel 40).

Control circuitry 16 may be coupled to illumination optics 36 over control path(s) 42. Control circuitry 16 may be coupled to fLCOS panel 40 over control path(s) 44. Control circuitry 16 may provide control signals to illumination optics 36 over control path(s) 42 that control illumination optics 36 to produce illumination light 38 (sometimes referred to herein as illumination 38). The control signals may, for example, control illumination optics 36 to produce illumination light 38 using a corresponding illumination sequence. The illumination sequence may involve sequentially illuminating light sources of different colors in illumination optics 36. In one suitable arrangement that is sometimes described herein as an example, the illumination sequence may be a green-heavy illumination sequence.

Illumination optics 36 may illuminate fLCOS display panel 40 using illumination light 38. Control circuitry 16 may provide control signals to fLCOS display panel 40 over control path(s) 44 that control fLCOS display panel 40 to modulate illumination light 38 to produce image light 22. For example, control circuitry 16 may provide image data such as image frames to fLCOS display panel 40. The image light 22 produced by fLCOS display panel 40 may include the image frames identified by the image data. Control circuitry 16 may, for example, control fLCOS display panel 40 to provide fLCOS drive voltage waveforms to electrodes in the display panel. The fLCOS drive voltage waveforms may be overdriven or underdriven to optimize the performance of display module 14A, if desired. While an arrangement in which display module 14A includes fLCOS display panel 40 is described herein as an example, in general, display module 14A may include any other desired type of reflective display panel (e.g., a DMD panel), an emissive display panel, etc.

Image light 22 may be collimated using collimating lens 34 (sometimes referred to herein as collimating optics 34). Optical system 14B may be used to present image light 22 output from display module 14A to eye box 24. Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module(s) 14A into waveguide 26 (e.g., at an angle such that the image light can propagate down waveguide 26 via total internal reflection), whereas output coupler 30 may be configured to couple image light 22 from within waveguide 26 to the exterior of waveguide 26 and towards eye box 24. Input coupler 28 may include a reflective or transmissive input coupling prism if desired. As an example, display module(s) 14A may emit image light 22 in the +Y direction towards optical system 14B.

When image light 22 strikes input coupler 28, input coupler 28 may redirect image light 22 so that the light propagates within waveguide 26 via total internal reflection towards output coupler 30 (e.g., in the +X direction). When image light 22 strikes output coupler 30, output coupler 30 may redirect image light 22 out of waveguide 26 towards eye box 24 (e.g., back in the −Y direction). In scenarios where cross-coupler 32 is formed at waveguide 26, cross-coupler 32 may redirect image light 22 in one or more directions as it propagates down the length of waveguide 26, for example. In this way, display module 14A may provide image light 22 to eye box 24 over an optical path that extends from display module 14A, through collimating lens 34, input coupler 28, cross coupler 32, and output coupler 30.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

Figure 3:
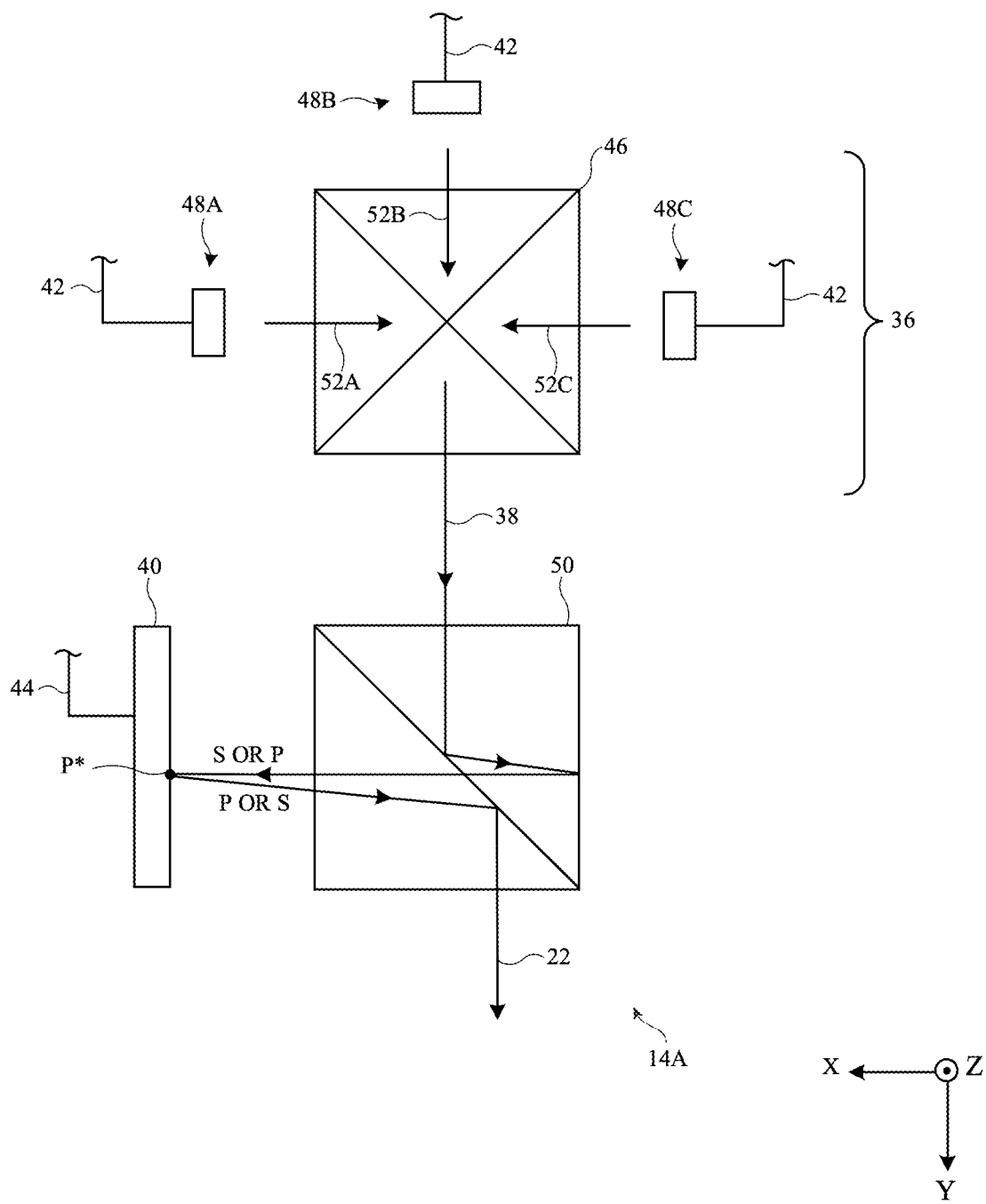
FIG. 3 is a top view of an illustrative display module having a ferroelectric liquid crystal on silicon (fLCOS) display panel in accordance with some embodiments.

FIG. 3 is a top view of display module 14A. As shown in FIG. 3, display module 14A may include illumination optics 36 that provide illumination light 38 to fLCOS display panel 40. fLCOS display panel 40 may modulate images onto illumination light 38 to produce image light 22.

Illumination optics 36 may include one or more light sources 48 such as a first light source 48A, a second light source 48B, and a third light source 48C. Light sources 48 may emit illumination light 52. Prism 46 (e.g., an X-plate) in illumination optics 36 may combine the illumination light 52 emitted by each of the light sources 48 to produce the illumination light 38 that is provided to fLCOS display panel 40. In one suitable arrangement that is sometimes described herein as an example, first light source 48A emits red illumination light 52A (e.g., light source 48A may be a red (R) light source), second light source 48B emits green illumination light 52B (e.g., light source 48B may be a green (G) light source), and third light source 48C emits blue illumination light 52C (e.g., light source 48C may be a blue (B) light source). This is merely illustrative. In general, light sources 48A, 48B, and 48C may respectively emit light in any desired wavelength bands (e.g., visible wavelengths, infrared wavelengths, near-infrared wavelengths, etc.).

An arrangement in which illumination optics 36 includes only one light source 48A, one light source 48B, and one light source 48C is sometimes described herein as an example. This is merely illustrative. If desired, illumination optics 36 may include any desired number of light sources 48A (e.g., an array of light sources 48A), any desired number of light sources 48B (e.g., an array of light sources 48B), and any desired number of light sources 48C (e.g., an array of light sources 48C). Light sources 48A, 48B, and 48C may include LEDs, OLEDs, uLEDs, lasers, or any other desired light sources. An arrangement in which light sources 48A, 48B, and 48C are LED light sources is described herein as an example. Light sources 48A, 48B, and 48C may be controlled (e.g., separately/independently controlled) by control signals received from control circuitry 16 (FIG. 2) over control path(s) 42. The control signals may, for example, control light sources 48A, 48B, and 48C to emit illumination light 52 using a corresponding illumination sequence in which one or more of the light sources emits illumination light at any given time and the active light sources cycle over time.

Illumination light 38 may include the illumination light 52A, 52B, and 52C emitted by light sources 48A, 48B, and 48C, respectively. Prism 50 may provide illumination light 38 to fLCOS display panel 40. If desired, additional optical components such as lens elements, microlenses, polarizers, prisms, beam splitters, and/or diffusers (not shown in FIG. 3 for the sake of clarity) may be optically interposed between light sources 48A-C and fLCOS display panel 40 to help direct illumination light 38 from illumination optics 36 to fLCOS display panel 40.

Prism 50 may direct illumination light 38 onto fLCOS display panel 40 (e.g., onto different pixels P* on fLCOS display panel 40). Control circuitry 16 may provide control signals to fLCOS display panel 40 over control path(s) 44 that control fLCOS display panel 40 to selectively reflect illumination light 38 at each pixel location to produce image light 22 (e.g., image light having an image as modulated onto the illumination light by fLCOS display panel 40). As an example, the control signals may drive fLCOS drive voltage waveforms onto the pixels of fLCOS display panel 40. Prism 50 may direct image light 22 towards collimating lens 34 of FIG. 2.

In general, fLCOS display panel 40 operates on illumination light of a single linear polarization. Polarizing structures interposed on the optical path between light sources 48A-C and fLCOS display panel 40 may convert unpolarized illumination light into linearly polarized illumination light (e.g., s-polarized light or p-polarized illumination light). The polarizing structures may, for example, be optically interposed between prism 50 and fLCOS display panel 40, between prism 46 and prism 50, between light sources 48A-C and prism 46, within light sources 48A-C, or elsewhere.

If a given pixel P* in fLCOS display panel 40 is turned on, the corresponding illumination light may be converted between linear polarizations by that pixel of the display panel. For example, if s-polarized illumination light 38 is incident upon a given pixel P*, fLCOS display panel 40 may reflect the s-polarized illumination light 38 to produce corresponding image light 22 that is p-polarized when pixel P* is turned on. Similarly, if p-polarized illumination light 38 is incident upon pixel P*, fLCOS display panel 40 may reflect the s-polarized illumination light 38 to produce corresponding image light 22 that is s-polarized when pixel P* is turned on. If pixel P* is turned off, the pixel does not convert the polarization of the illumination light, which prevents the illumination light from reflecting out of fLCOS display panel 40 as image light 22.

Figure 4:
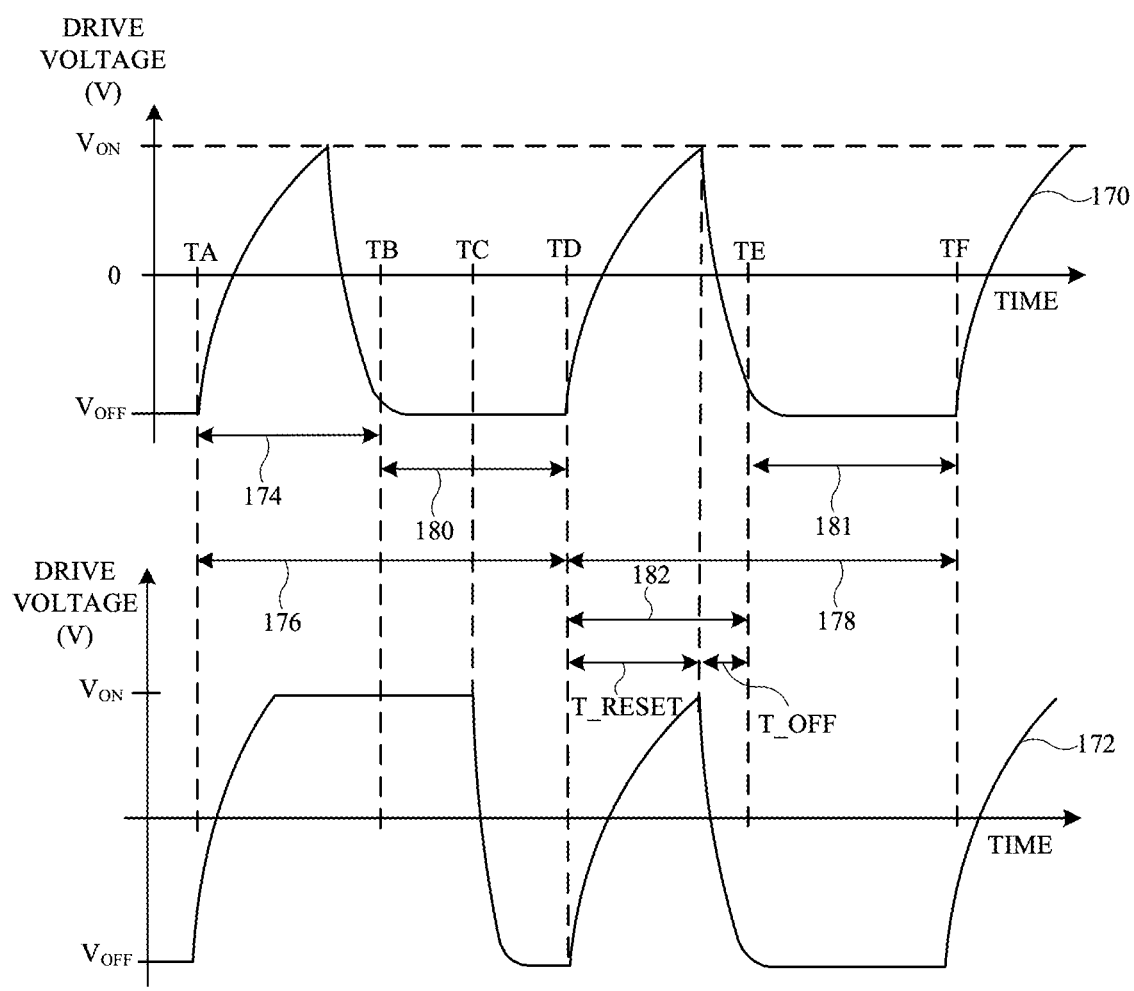
FIG. 4 is a timing diagram of illustrative driving voltages that may be used to drive an fLCOS display panel in accordance with some embodiments.

Control circuitry 16 (FIG. 2) may drive image data onto fLCOS display panel 40 using fLCOS drive voltage waveforms (e.g., based on control signals provided to fLCOS display panel 40 over control path(s) 44 of FIG. 2). FIG. 4 is a timing diagram of two illustrative fLCOS drive voltage waveforms that may be used to drive fLCOS display panel 40.

As shown in FIG. 4, fLCOS drive voltage waveform (curve) 170 plots the fLCOS drive voltage as a function of time for producing image light 22 with a gray level of zero. fLCOS drive voltage waveform (curve) 172 plots the fLCOS drive voltage as a function of time for producing image light 22 with a gray level of 128 (e.g., in a 256-bit field). The fLCOS drive voltage may vary between a first drive voltage $V_{OFF}$ (e.g., a negative voltage level) and a second drive voltage $V_{ON}$ (e.g., a positive voltage level).

Waveforms 170 and 172 may be at first drive voltage $V_{OFF}$ prior to time TA. At time TA, waveform 170 may begin to increase to a peak at second drive voltage $V_{ON}$. Waveform 170 may return to first drive voltage $V_{OFF}$ at time TB. The time period between times TA and TB may sometimes be referred to herein as dark gap 174. Dark gap 174 may be used to reset fLCOS display panel 40, for example.

The time period between times TB and TD may form a duty period 180 during which at least one light source 48 (e.g., red light source 48A of FIG. 3) may be turned on to provide illumination light 38 to fLCOS display panel 40. Because waveform 170 is at first drive voltage $V_{OFF}$ during duty period 180, the fLCOS display panel may not produce image light during duty period 180 when driven using waveform 170. The time period between times TA and TD may sometimes be referred to as field period 176. Field period 176 may be associated with the illumination of fLCOS display panel 40 by a corresponding field of illumination light (e.g., illumination light of a particular color) and may include the reset time (e.g., a portion of dark gap 174) required to reset the fLCOS display panel to begin reflecting the field of illumination light as image light 22.

At time TD, waveform 170 may to increase to a peak at second drive voltage $V_{ON}$. Waveform 170 may return to first drive voltage $V_{OFF}$ at time TE. The time period between times TD and TE may sometimes be referred to herein as the dark gap 182. The time period between time TD and the time when waveform 170 reaches second drive voltage $V_{ON}$ may sometimes be referred to herein as reset time T_RESET. Reset time T_RESET may allow time for fLCOS display panel 40 to reset for the next field of the image. The time period between the time when waveform 170 reaches second drive voltage $V_{ON}$ and time TE may sometimes be referred to herein as off time T_OFF. The duration of dark gap 174 (e.g., off time T_OFF) may be adjusted to control the overall power consumption of display module 14A.

The time period between times TE and TF may form a duty period 181 during which a light source other than the light source activated during duty period 180 may be turned on to provide illumination light 38 to fLCOS display panel 40. A subsequent dark gap may begin at time TF, as waveform 170 increases back to second drive voltage $V_{ON}$. This cycle may continue for each of the fields in the image frame to be displayed. The time period between times TE and TF may sometimes be referred to as field period 178.

As shown in FIG. 4, waveform 172 may remain at second drive voltage $V_{ON}$ after time TA and until time TC. By driving fLCOS display panel 40 at second drive voltage $V_{ON}$ during a portion of duty period 180 (e.g., between times TB and TC), fLCOS display panel 40 may reflect some of the illumination light 38 incident during duty period 180 (as image light 22). This may allow fLCOS display panel 40 to produce image light 22 at a higher gray level when driven by waveform 172 than when driven by waveform 170, for example.

The example of FIG. 4 is merely illustrative. In general, any desired fLCOS drive voltage waveforms may be used to drive fLCOS display panel 40 to produce any desired pixel values of any desired colors in image light 22. If desired, the optical performance of fLCOS display panel 40 may be optimized by overdriving or underdriving the fLCOS drive voltage provided to fLCOS display panel 40. The example of FIG. 4 in which the drive voltage waveform follows a reset-based driving scheme is merely illustrative. In another suitable arrangement, a reset-less driving scheme may be used (e.g., there may not be dark gaps between each of the color fields and, if desired, an inverse waveform pattern may be used after each waveform pattern for charge balancing).

Figure 5:
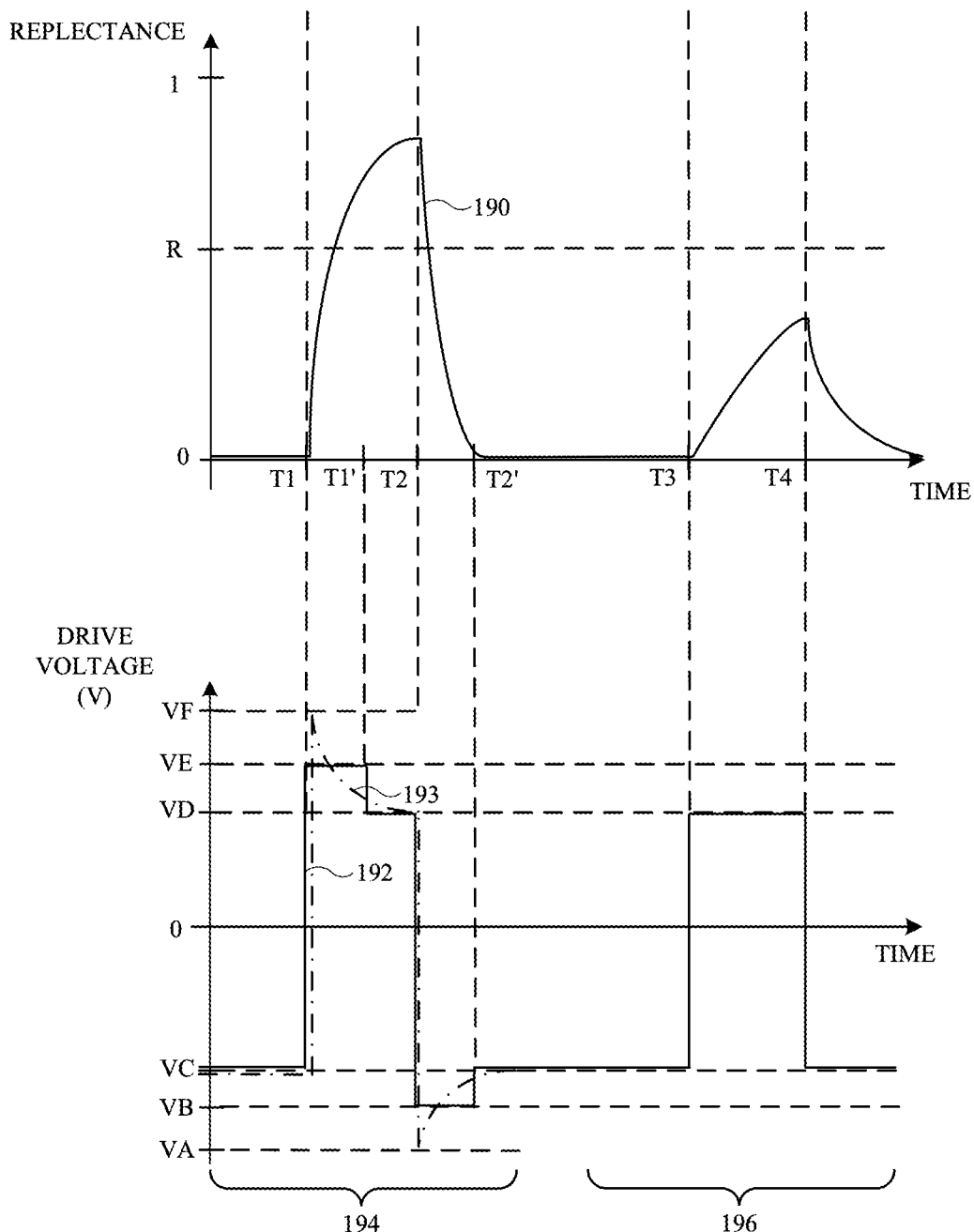
FIG. 5 is a timing diagram showing how an illustrative fLCOS display panel may be overdriven by a non-square wave driving voltage waveform in accordance with some embodiments.

FIG. 5 is a timing diagram showing one example of how fLCOS display panel 40 may be overdriven to optimize optical performance. As shown in FIG. 5, fLCOS display panel 40 may be driven using fLCOS drive voltage waveform (curve) 192. Curve 190 of FIG. 5 plots the corresponding reflectance of fLCOS display panel 40 when driven using fLCOS drive voltage waveform 192.

In the example of FIG. 5, fLCOS drive voltage waveform 192 has four possible voltage levels (e.g., a first drive voltage level VB, a second drive voltage level VC, a third drive voltage level VD, and a fourth drive voltage level VE). First drive voltage level VB may be less than second drive voltage level VC, second drive voltage level VC may be less than a voltage level of zero, third drive voltage level VD may be greater than a voltage level of zero, and fourth drive voltage level VE may be greater than third drive voltage level VE. This example is merely illustrative. In general, fLCOS drive voltage waveform 192 may have any desired number of possible voltage levels of any desired magnitudes. In one suitable arrangement that is sometimes described herein as an example, first drive voltage level VB may be −1.8V, second drive voltage level VC may be −1.5V, third drive voltage level VD may be 1.5V, and fourth drive voltage level VE may be 1.8V. Other drive voltage levels may be used if desired.

As shown by fLCOS drive voltage waveform 192, when fLCOS display panel 40 is not being overdriven, fLCOS drive voltage waveform 192 may include square wave pulses such as square wave pulse 196 (e.g., where the fLCOS drive voltage rises from second voltage level VC to third voltage level VD at time T3 and falls back to second voltage level VC at time T4). Square wave pulse 196 may produce a corresponding spike in the reflectance of fLCOS display panel 40 from a reflectance of zero to a reflectance of R (e.g., a value greater than 0 and less than 1.0), as shown by curve 190.

In order to overdrive fLCOS display panel 40, control circuitry 16 may drive fLCOS display panel 40 using a non-square wave fLCOS drive voltage waveform, such as an fLCOS drive voltage waveform that includes non-square wave pulses such as non-square wave pulse 194 of fLCOS drive voltage waveform 192. For example, at time T1, fLCOS drive voltage waveform 192 may increase from second voltage level VC to fourth voltage level VE (sometimes referred to herein as overdrive voltage level VE). If desired, at time T1', fLCOS drive voltage waveform 192 may decrease to third voltage level VD. At time T2, fLCOS drive voltage waveform 192 may decrease to first voltage level VB. At time T2', fLCOS drive voltage waveform 192 may increase back to second voltage level VC.

Non-square wave pulse 194 of fLCOS drive voltage waveform 192 may produce a corresponding spike in the reflectance of fLCOS display panel 40 from a reflectance of zero at time T1 to a reflectance greater than reflectance R at or near time T1' (e.g., a reflectance at or near 1.0). In other words, overdriving fLCOS display panel 40 in this way may serve to increase the reflectance of fLCOS display panel 40 relative to scenarios where fLCOS display panel 40 is not overdriven, thereby maximizing the overall optical efficiency of display module 14A in producing image light 22.

The example of FIG. 5 is merely illustrative. In practice, curve 192 and non-square wave pulse 194 may have other shapes. In general, fLCOS display panel 40 may be overdriven using any desired non-square wave fLCOS drive voltage waveform (e.g., a waveform having non-square wave pulses that reach an overdrive voltage level such as fourth voltage level VE). Another example of a non-square wave pulse 194 that may be used to overdrive fLCOS display panel 40 is shown by dashed curve 193 of FIG. 5. In this example, the fLCOS drive voltage rises to voltage level VF at time T1, drops continuously to voltage level VD between times T1 and T2, drops to voltage level VA at time T2, and rises continuously to voltage level VC between times T2 and T2'. Voltage level VF may be greater than 1.8V (e.g., 2.0V) and voltage level VA may be less than −1.8V (e.g., −2.0V), as one example. The precise shape of curve 193 between times T1 and T2 and between times T2 and T2' may, for example, be altered to optimize the performance of fLCOS display panel 40. The example of FIG. 5 in which fLCOS display panel 40 is overdriven is merely illustrative and, if desired, fLCOS display panel 40 may be underdriven. Different non-square wave fLCOS drive voltage waveforms may be used to drive fLCOS display panel 40 at different times (e.g., depending on the operating conditions of display 14).

Figure 6:
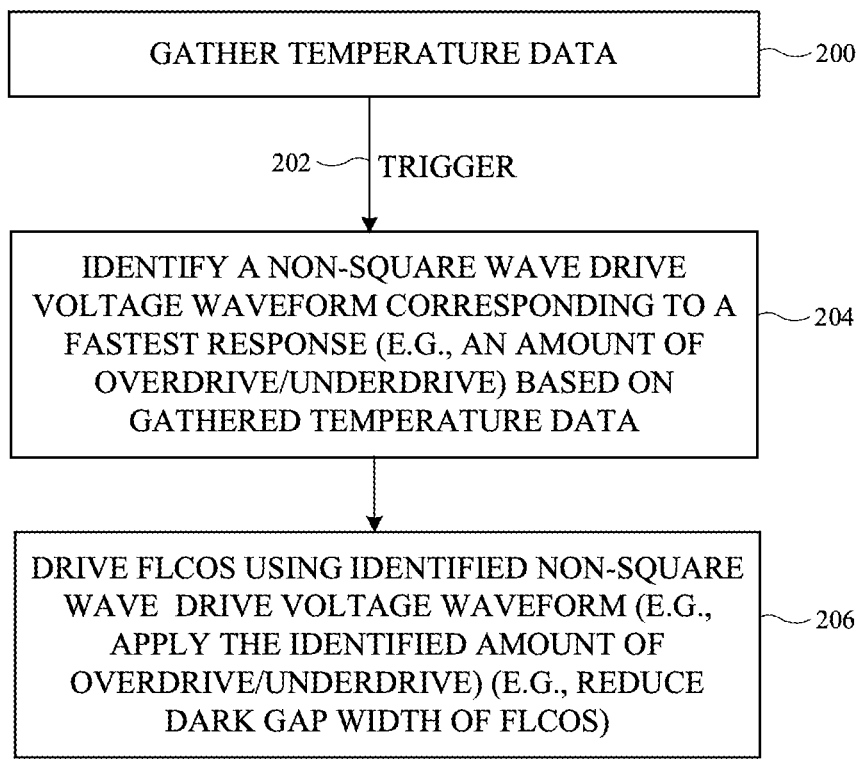
FIG. 6 is a flow chart of illustrative steps that may be involved in overdriving an fLCOS display panel based on temperature sensor measurements in accordance with some embodiments.

In practice, the optimal overdrive or underdrive waveform for fLCOS display panel 40 may vary as the operating temperature of fLCOS display panel 40 changes over time. If desired, control circuitry 16 may overdrive or underdrive fLCOS display panel 40 based on the temperature of display 14 (e.g., the temperature of fLCOS display panel 40). FIG. 6 is a flow chart of illustrative steps that may be performed by control circuitry 16 (FIG. 2) in overdriving or underdriving fLCOS display panel 40 based on the temperature of display 14.

At step 200, control circuitry 16 may gather temperature sensor data using one or more temperature sensors 19 in system 10 (FIG. 1). If desired, control circuitry 16 may estimate the temperature of fLCOS display panel 40 based on the gathered temperature sensor data (e.g., using a temperature model for system 10). In scenarios where multiple temperature sensors 19 are used to gather temperature sensor data, the temperature sensors may be placed at different locations across system 10 if desired. Control circuitry 16 may also determine whether a trigger condition has been met before proceeding.

The trigger condition may be a predetermined change in the gathered temperature sensor data, may occur when the gathered temperature data reaches a threshold temperature level, may be based on the content of the image(s) to be displayed using fLCOS display panel 40, may be based on a software call issued by one or more programs running on system 10, may be based on a user input provided by a user of system 10, etc. Once the trigger condition has been met, processing may proceed to step 204 as shown by arrow 202.

At step 204, control circuitry 16 may identify a non-square wave fLCOS drive voltage waveform with which to overdrive or underdrive fLCOS display panel 40 based on the gathered temperature sensor data. For example, control circuitry 16 may identify a non-square wave fLCOS drive voltage waveform that optimizes the optical performance (e.g., reflectance) of fLCOS display panel 40 for its current temperature (e.g., as determined while processing step 200). If desired, control circuitry 16 may store predetermined (optimal) non-square wave fLCOS drive voltage waveforms for different temperature values of fLCOS display panel 40 (e.g., in a look-up table or other data structure) and may identify the stored non-square wave fLCOS drive voltage waveform corresponding to the current (e.g., estimated) temperature of fLCOS display panel 40. The stored non-square wave fLCOS drive voltage waveforms may be determined during the design, manufacture, assembly, testing, and/or calibration of system 10 if desired.

At step 206, control circuitry 16 may drive fLCOS display panel 40 using the non-square wave drive voltage waveform identified while processing step 204. Driving fLCOS display panel 40 in this way may maximize the reflectance of fLCOS display panel 40 for the current operating temperature of the display panel, for example. Control circuitry 16 may continue to overdrive fLCOS display panel 40 for a predetermined time period, until a new trigger condition is detected, for a predetermined number of frames, etc.

Figure 7:
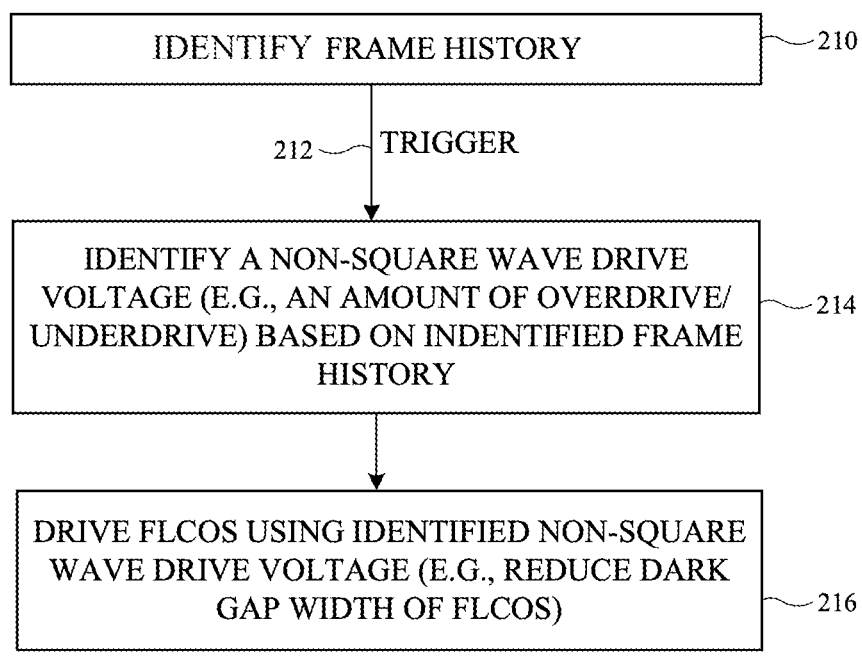
FIG. 7 is a flow chart of illustrative steps that may be involved in overdriving an fLCOS display panel based on frame history information in accordance with some embodiments.

The example of FIG. 6 in which control circuitry 16 overdrives fLCOS display panel 40 based on the temperature of display 14 is merely illustrative. In another suitable arrangement, control circuitry 16 may overdrive or underdrive fLCOS display panel 40 based on frame history information. FIG. 7 is a flow chart of illustrative steps that may be performed by control circuitry 16 (FIG. 2) in overdriving or underdriving fLCOS display panel 40 based on frame history information.

At step 210, control circuitry 16 may identify frame history information for fLCOS display panel 40. The frame history information may include, for example, information about the image frames that have been previously displayed using fLCOS display panel 40. Control circuitry 16 may also determine whether a trigger condition has been met before proceeding.

The trigger condition may be a predetermined change in the gathered temperature sensor data, may occur when the gathered temperature data reaches a threshold temperature level, may be based on the content of the image(s) to be displayed using fLCOS display panel 40, may be based on a software call issued by one or more programs running on system 10, may be based on a user input provided by a user of system 10, etc. In one suitable arrangement that is described herein as an example, the trigger condition may occur when the previous image frame displayed was fully on or fully off. Once the trigger condition has been met, processing may proceed to step 214 as shown by arrow 212.

At step 214, control circuitry 16 may identify a non-square wave fLCOS drive voltage waveform with which to overdrive or underdrive fLCOS display panel 40 based on the identified frame history information. For example, control circuitry 16 may identify a non-square wave fLCOS drive voltage waveform that optimizes the optical performance (e.g., reflectance) of fLCOS display panel 40 depending on the immediately previous image frame(s) displayed by fLCOS display panel 40 (e.g., a first fLCOS drive voltage waveform when the previous image frame was fully on, a second fLCOS drive voltage waveform when the previous image frame was fully off, etc.).

At step 216, control circuitry 16 may drive fLCOS display panel 40 using the non-square wave drive voltage waveform identified while processing step 214. Driving fLCOS display panel 40 in this way may maximize the reflectance of fLCOS display panel 40 for the current operating temperature of the display panel, for example. Control circuitry 16 may continue to overdrive fLCOS display panel 40 for a predetermined time period, until a new trigger condition is detected, for a predetermined number of frames, etc.

Overdriving fLCOS display panel 40 (e.g., using non-square wave fLCOS drive voltage waveforms as identified while processing step 204 of FIG. 6 or step 214 of FIG. 7) may, for example, serve to reduce the duration (width) of the dark gap of fLCOS display panel 40 relative to scenarios where fLCOS display panel 40 is driven using a square wave fLCOS drive voltage waveform. This may serve to further optimize power consumption in display module 14A, for example. Control circuitry 16 may therefore sometimes be referred to herein as reducing the duration of the dark gap of fLCOS display panel 40 based on gathered temperature sensor data or identified frame history information. The arrangement of FIG. 7 may be combined with the arrangement of FIG. 6 if desired (e.g., control circuitry 16 may identify a non-square wave fLCOS drive voltage that optimizes the optical performance of fLCOS display panel 40 given both the current temperature of fLCOS display panel 40 and the frame history information of fLCOS display panel 40). If desired, the non-square wave drive voltage waveform to use may be selected based on the previous frame's target reflectance state and temperature information. For example, a look up table may modify the non-square wave drive voltage waveform for the current frame based on any previous state. As one example, if the previous frame was on for one-half the illumination field time, it would have a different non-square wave drive voltage for the current frame when the previous frame was on for 98% of the illumination field time. In driving fLCOS panel 40, the percent on (duty cycle) during the illumination time may be selected to control the grey level for the field.

Figure 8:
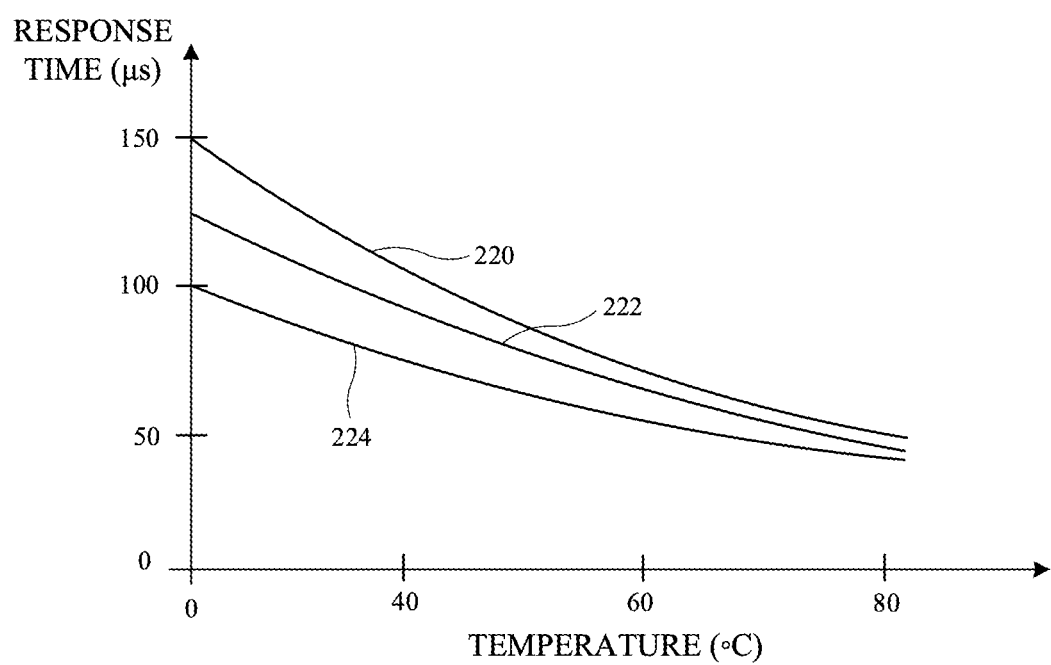
FIG. 8 is a plot of fLCOS performance (response time as a function of temperature) that shows how overdriving an fLCOS display panel based on temperature sensor measurements may minimize fLCOS response time in accordance with some embodiments.

Overdriving fLCOS display panel 40 may also serve to optimize the optical performance of display module 14A by reducing the response time of fLCOS display panel 40. FIG. 8 is a plot showing how overdriving fLCOS display panel 40 may reduce the response time of fLCOS display panel 40 across a wide range of operating temperatures.

In the example of FIG. 8, the horizontal axis plots the temperature of fLCOS display panel 40 (e.g., in degrees Celsius) and the vertical axis plots the response time of fLCOS display panel 40 (e.g., in microseconds). Curve 220 plots the response time of fLCOS display panel 40 when driven using square-wave fLCOS drive voltage pulses (e.g., pulses such as pulse 196 of FIG. 5). As shown by curve 220, the response time of fLCOS display panel 40 may decrease as temperature increases.

Curve 222 plots the response time of fLCOS display panel 40 when (over) driven using non-square-wave fLCOS drive voltage waveform pulses having a first peak voltage level (e.g., pulses such as pulse 194 of FIG. 5 having a peak voltage given by fourth voltage level VE). Curve 224 plots the response time of fLCOS display panel 40 when (over) driven using a non-square-wave fLCOS drive voltage waveform pulses having a second peak voltage level that is higher than the first peak voltage level. The peak voltage level of the square-wave fLCOS drive voltage pulses associated with curve 220 may be 1.5V, the first peak voltage level associated with curve 222 may be 1.65V, and the second peak voltage level associated with curve 224 may be 1.8V, as one example. In general, the first peak voltage level may be any desired voltage greater than 1.5V (e.g., in scenarios where $V_{ON}$ of FIG. 4 is 1.5V), greater than 1.6V, greater than 1.7V, greater than 1.8V, etc.

As shown by curves 222 and 224, overdriving fLCOS display panel 40 may serve to reduce the response time of fLCOS display panel 40 across all temperatures. As shown by curve 224, overdriving fLCOS display panel 40 with a non-square wave fLCOS drive voltage waveform having a greater peak voltage level may serve to further decrease the response time of fLCOS display panel 40. In this way, overdriving fLCOS display panel 40 may serve to further optimize the optical performance of display module 14A by reducing the response time of fLCOS display panel 40 across a wide range of operating temperatures. The example of FIG. 8 is merely illustrative. In practice, curves 220, 222, and 224 may have other shapes.

The foregoing is merely illustrative and various modifications can be made to the described embodiments. The foregoing embodiments may be implemented individually or in any combination.

What is claimed is:

1. An electronic device comprising:
a light source configured to produce illumination;
a reflective panel configured to produce light based on the illumination and image data;
a waveguide configured to propagate the light via total internal reflection; and
a temperature sensor configured to gather temperature sensor data, wherein the reflective panel is configured to produce the light using a non-square wave drive voltage waveform that has a first shape when the temperature sensor data is at a first level and that has a second shape that is different from the first shape when the temperature sensor data is at a second level.

2. The electronic device of claim 1, wherein the non-square wave drive voltage waveform is selected based on an estimated temperature of the reflective panel identified based on the temperature sensor data.

3. The electronic device of claim 1, further comprising an additional temperature sensor configured to gather additional temperature sensor data, wherein the non-square wave drive voltage waveform is selected based on the additional temperature sensor data.

4. The electronic device of claim 1, wherein the reflective panel is configured to be overdriven using the selected non-square wave drive voltage waveform.

5. The electronic device of claim 1, wherein the reflective panel is configured to be underdriven using the selected non-square wave drive voltage waveform.

6. The electronic device of claim 1, wherein the non-square wave drive voltage waveform is selected from a set of predetermined non-square wave drive voltage waveforms stored on the electronic device.

7. The electronic device of claim 1, wherein the non-square wave drive voltage waveform is selected based at least in part on frame history information for the reflective panel.

8. The electronic device of claim 1, wherein the non-square wave drive voltage waveform has a peak voltage level that is greater than or equal to 1.8V.

9. An electronic device comprising:
a light source configured to produce illumination;
a reflective panel configured to produce light by modulating the illumination using image data; and
a waveguide configured to propagate the light via total internal reflection, wherein the reflective panel is configured to produce the light using a non-square wave drive voltage waveform that is based on frame history information associated with the image data.

10. The electronic device of claim 9, wherein the reflective panel is configured to produce the light using a first non-square wave drive voltage waveform when the frame history information identifies that a previous image frame displayed by the reflective panel was on for a first percentage of a corresponding illumination time and wherein the reflective panel is configured to produce the light using a second non-square drive voltage waveform when the frame history information identifies that the previous image frame displayed by the reflective panel was on for a second percentage of the illumination time that is different from the first percentage of the illumination time.

11. The electronic device of claim 9, wherein the reflective panel is configured to be overdriven using the non-square wave drive voltage waveform.

12. The electronic device of claim 9, wherein the reflective panel is configured to be underdriven using the non-square wave drive voltage waveform.

13. The electronic device of claim 9, wherein the non-square wave drive voltage waveform is selected from a set of predetermined non-square wave drive voltage waveforms stored on the electronic device.

14. The electronic device of claim 13, wherein the set of predetermined non-square wave drive voltage waveforms are stored in a look-up table on the electronic device.

15. The electronic device of claim 9, wherein the non-square wave drive voltage waveform has a peak voltage level that is greater than or equal to 1.8V.

16. The electronic device of claim 9, wherein the reflective panel is configured to produce additional light using a square wave drive voltage waveform.

17. The electronic device of claim 16, wherein the reflective panel exhibits greater reflectance when driven by the selected non-square wave drive voltage waveform than when driven by the square wave drive voltage waveform.

18. An electronic device comprising:
a light source configured to produce illumination;
a reflective panel configured to produce light by modulating the illumination using image data;
a waveguide configured to propagate the light via total internal reflection; and
a temperature sensor configured to gather temperature sensor data, wherein the reflective panel has a dark gap that is adjusted by driving the reflective panel with a first overdrive waveform when the temperature sensor data has a first level and by driving the reflective panel with a second overdrive waveform that is different from the first overdrive waveform when the temperature sensor data has a second level that is different from the first level.

* * * * *